(12) United States Patent
Irie et al.

(10) Patent No.: US 11,275,005 B2
(45) Date of Patent: Mar. 15, 2022

(54) FATIGUE LIMIT STRESS SPECIFICATION SYSTEM, FATIGUE LIMIT STRESS SPECIFICATION DEVICE, AND FATIGUE LIMIT STRESS SPECIFICATION METHOD

(71) Applicant: Panasonic Intellectual Property Management Co., Ltd., Osaka (JP)

(72) Inventors: Yousuke Irie, Nara (JP); Hirotsugu Inoue, Tokyo (JP); Ryougo Kawai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 466 days.

(21) Appl. No.: 16/449,777

(22) Filed: Jun. 24, 2019

(65) Prior Publication Data

US 2019/0310174 A1 Oct. 10, 2019

Related U.S. Application Data

(63) Continuation of application No. PCT/JP2017/029846, filed on Aug. 22, 2017.

(30) Foreign Application Priority Data

Dec. 26, 2016 (JP) .............................. JP2016-251885

(51) Int. Cl.
*G01N 3/36* (2006.01)
*G01N 3/34* (2006.01)
(Continued)

(52) U.S. Cl.
CPC ................ *G01N 3/36* (2013.01); *G01N 3/18* (2013.01); *G01N 3/32* (2013.01); *G01N 3/34* (2013.01);
(Continued)

(58) Field of Classification Search
CPC .. G01N 3/32; G01N 3/34; G01N 3/36; G01N 3/38; G01N 2203/0073
See application file for complete search history.

(56) References Cited

U.S. PATENT DOCUMENTS 9,243,985 B2 * 1/2016 Khonsari ................. G01N 3/32
2009/0000382 A1 * 1/2009 Sathish .................. G01N 25/72
73/606

FOREIGN PATENT DOCUMENTS

JP       6-26947       2/1994
JP       2006-29963    2/2006
(Continued)

OTHER PUBLICATIONS

Kim et al., "Measurement of thermal stress and prediction of fatigue for STS using lock-in thermography" Asia-Pacific Conference on NDT, Nov. 5-10, 2006, Auckland, New Zealand. (Year: 2006).*
(Continued)

*Primary Examiner* — Paul M. West
(74) *Attorney, Agent, or Firm* — Wenderoth, Lind & Ponack, L.L.P.

(57) ABSTRACT

A fatigue limit stress specification system includes: a vibration generator that repeatedly applies a load to an object to be measured; a temperature sensor that measures a change in temperature of the object to be measured; and an information processing device that measures a fatigue limit stress of the object to be measured. The information processing device obtains a relation between a temperature amplitude of a fundamental frequency component of vibration for the object to be measured and a temperature amplitude of a second harmonic component of the vibration, performs fitting on the relation by using a first approximate line and a second approximate line, the first approximate line including a quadratic curve, the second approximate line including a quadratic curve, and obtains the fatigue limit stress of the object to be measured based on an intersection of the first approximate line and the second approximate line.

6 Claims, 18 Drawing Sheets

(51) Int. Cl.
*G01N 3/32* (2006.01)
*G01N 3/18* (2006.01)

(52) U.S. Cl.
CPC ............ *G01N 2203/0073* (2013.01); *G01N 2203/0222* (2013.01)

(56) References Cited

FOREIGN PATENT DOCUMENTS

| | | |
|---|---|---|
| JP | 2006-250683 | 9/2006 |
| JP | 2010223957 A * | 10/2010 |
| JP | 2016-24056 | 2/2016 |

OTHER PUBLICATIONS

Communication pursuant to Article 94(3) EPC dated Sep. 21, 2021 for the related European Patent Application No. 17888692.5.
Fraux, David et al., "Etude par thermographic infrarouge des echanges thermiques d'une eprouvette au cours d'un essai de fatigue cyclique", with Partial English-language translation, Congres Francis de Thermique Sft 2009, Vannes, France, Dec. 31, 2009 (Dec. 31, 2009), pp. 1-6, XP009139308, Retrieved from the Internet: URL: http://www.sft.asso.fr/Local/sft/dir/user-3775/documents/actes/congres_2009/Communications/127.pdf [retrieved on Dec. 5, 2019].
International Search Report dated Nov. 14, 2017 in corresponding International Application No. PCT/JP2017/029846.

* cited by examiner

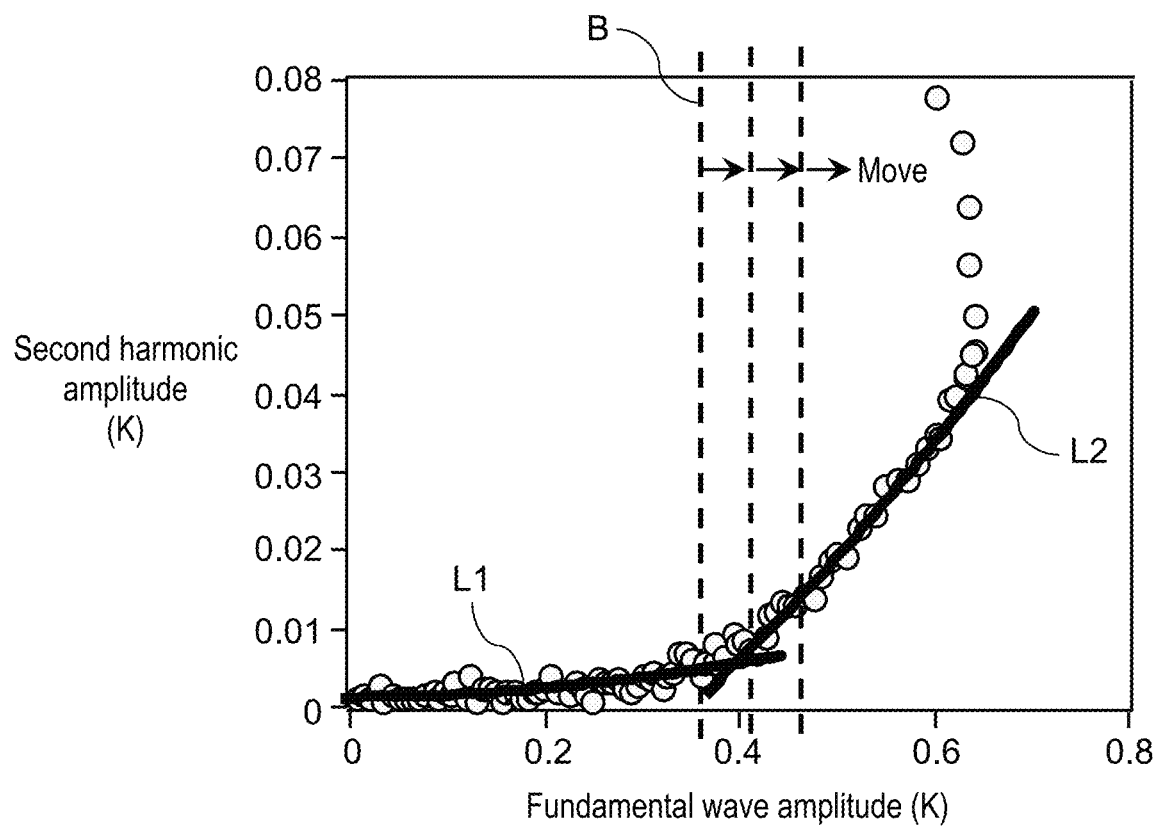

FIG. 12A
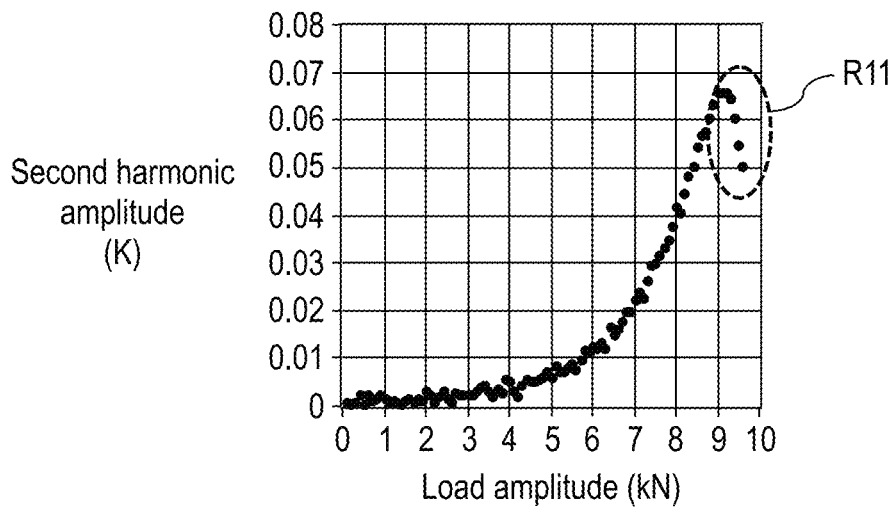
FIG. 12B
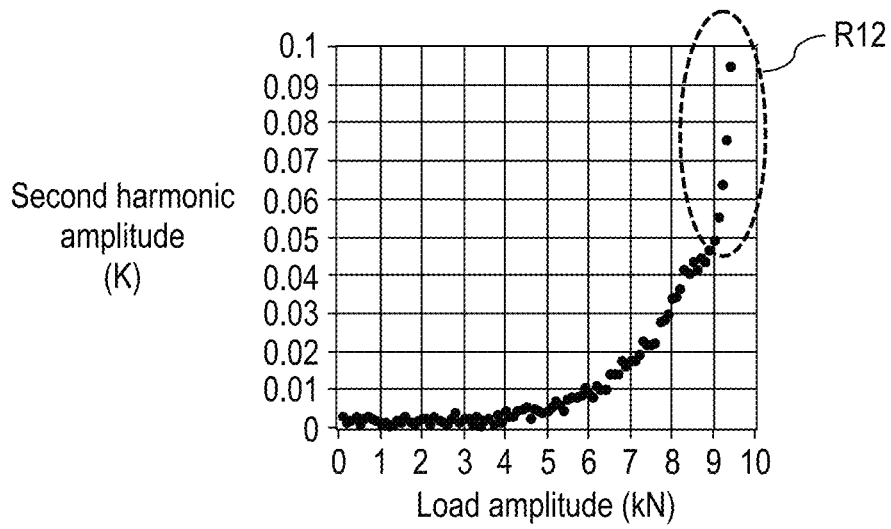
FIG. 12C
$$\overline{R}^2 = 1 - \frac{n-1}{n-k-1}\left(1 - \frac{\sum_{i=1}^{n}(\hat{y}_i - \overline{y})^2}{\sum_{i=1}^{n}(y_i - \overline{y})^2}\right)$$
$\overline{R}^2$: Degree-of-freedom adjusted determination coefficient   $\hat{y}_i$: value of approximate function   $n$: Number of pieces of data   $y_i$: Width of temperature amplitude   $\overline{y}$: Mean value of $y_i$   $k$: Degree of approximate function

FIG. 15

Radius of cutout 5.0 mm (Unit: kN)

|  | Quadratic curve and quadratic curve | Quadratic curve and straight line |
|---|---|---|
| Evaluation value of data 1 | 6.445 | 6.476 |
| Evaluation value of data 2 | 6.266 | 6.379 |
| Evaluation value of data 3 | 6.200 | 6.239 |
| Evaluation value of data 4 | 6.574 | 6.581 |
| Evaluation value of data 5 | 6.425 | 6.461 |
| Mean value | 6.382 | 6.427 |

Fatigue limit obtained in fatigue test: <u>6.4 kN</u>

FIG. 16

Radius of cutout 2.0 mm  (Unit: kN)

|  | Quadratic curve and quadratic curve | Quadratic curve and straight line |
|---|---|---|
| Evaluation value of data 1 | 5.490 | 5.524 |
| Evaluation value of data 2 | 5.760 | 5.811 |
| Evaluation value of data 3 | 5.931 | 5.978 |
| Evaluation value of data 4 | 5.920 | 5.947 |
| Evaluation value of data 5 | 5.891 | 5.925 |
| Mean value | 5.798 | 5.837 |

Fatigue limit obtained in fatigue test: 5.7 kN

FATIGUE LIMIT STRESS SPECIFICATION SYSTEM, FATIGUE LIMIT STRESS SPECIFICATION DEVICE, AND FATIGUE LIMIT STRESS SPECIFICATION METHOD

TECHNICAL FIELD

The present disclosure relates to a fatigue limit stress specification system, a fatigue limit stress specification device, and a fatigue limit stress specification method for measuring a fatigue limit stress of an object to be measured.

BACKGROUND ART

PTL 1 discloses a fatigue limit stress specification system that uses dissipation energy measuring means for applying a repeated stress amplitude to an object to be measured and measuring a distribution in a certain region of an amount of an increase in average temperature that is generated due to energy dissipation within a material, by using an infrared camera.

The fatigue limit stress specification system of PTL 1 includes a vibration generator, an infrared camera, and an information processing device. The vibration generator repeatedly applies a load to an object to be measured. The infrared camera obtains a temperature image of the object to be measured. The information processing device includes Fourier transform means for processing the temperature image of the object to be measured that has been obtained from the infrared camera. The information processing device performs a dissipation energy measurement process for measuring dissipation energy and a fatigue limit stress specification process for specifying a fatigue limit stress on the basis of a measurement result that has been obtained in the dissipation energy measurement process.

In the dissipation energy measurement process, temperature amplitude images of a fundamental frequency component and a second harmonic component of a generated vibration are obtained on the basis of the temperature image captured by the infrared camera. Then, dissipation energy of a pixel region that has a maximum inclination of a load characteristic with respect to a temperature amplitude of the fundamental frequency component is extracted within a region indicating a maximum temperature amplitude of the second harmonic component.

In the fatigue limit stress specification process, a fatigue limit stress is specified on the basis of a degree-of-freedom adjusted determination coefficient and an intersection of two approximate lines obtained according to the Gauss-Newton method. As the two approximate lines, a polynomial expressed by $y = ax^n + b$ ($n=2$) and a straight line are used.

By employing the fatigue limit stress specification device system of PTL 1, a fatigue limit stress of a material or a part that has stress concentration can be obtained objectively and accurately without relying on subjective judgement.

CITATION LIST

Patent Literature

PTL 1: Unexamined Japanese Patent Publication No. 2016-24056

SUMMARY

The present disclosure provides a fatigue limit stress specification system that is capable of precisely measuring a fatigue limit stress of an object to be measured.

In a first aspect of the present disclosure, a fatigue limit stress specification system is provided that measures a fatigue limit stress of an object to be measured on the basis of a change in temperature of the object to be measured, the change in temperature being generated when the object to be measured is vibrated while a load is increased stepwise. The fatigue limit stress specification system includes a vibration generator, a temperature sensor, and an information processing device. The vibration generator repeatedly applies each of the loads to the object to be measured at a predetermined frequency. The temperature sensor obtains a change in temperature indicating the change in temperature of the object to be measured that each of the loads has been applied to. The information processing device obtains the fatigue limit stress of the object to be measured on the basis of a temperature image obtained from the temperature sensor. The information processing device obtains a relation between a temperature amplitude of a fundamental frequency component of vibration for the object to be measured and a temperature amplitude of a second harmonic component of the vibration, based on the change in temperature that has been obtained by the temperature sensor. The information processing device performs fitting on the relation by using a first approximate line and a second approximate line, the first approximate line including a quadratic curve, the second approximate line including a quadratic curve, and obtains the fatigue limit stress of the object to be measured based on an intersection of the first approximate line and the second approximate line.

In a second aspect of the present disclosure, a fatigue limit stress specification device is provided that measures a fatigue limit stress of an object to be measured on the basis of a change in temperature of the object to be measured, the change in temperature being generated when the object to be measured is vibrated while a load is increased stepwise. The fatigue limit stress specification device includes an obtaining unit and an arithmetic unit. The obtaining unit obtains the change in temperature of the object to be measured. The arithmetic unit analyzes the change in temperature, and measures the fatigue limit stress of the object to be measured. The arithmetic unit obtains a relation between a temperature amplitude of a fundamental frequency component of vibration for the object to be measured and a temperature amplitude of a second harmonic component of the vibration, based on the change in temperature, performs fitting on the relation by using a first approximate line and a second approximate line, the first approximate line including a quadratic curve, the second approximate line including a quadratic curve, and obtains the fatigue limit stress of the object to be measured based on an intersection of the first approximate line and the second approximate line.

In a third aspect of the present disclosure, a fatigue limit stress specification method is provided for measuring a fatigue limit stress of an object to be measured on the basis of a change in temperature of the object to be measured, the change in temperature being generated when the object to be measured is vibrated while a load is increased stepwise. In the fatigue limit stress specification method, the load is repeatedly applied to the object to be measured at a predetermined frequency while the load is increased stepwise. The change in temperature of the object to be measured that the load has been applied to is, and a relation between a temperature amplitude of a fundamental frequency component of vibration for the object to be measured and a temperature amplitude of a second harmonic component of the vibration is obtained based on the change in temperature. Fitting is performed on the relation by using a first approximate line and a second approximate line, the first approximate line including a quadratic curve, the second approximate line including a quadratic curve, and the fatigue limit stress of the object to be measured is obtained based on an intersection of the first approximate line and the second approximate line.

According to the present disclosure, fitting is performed on a relation between a temperature amplitude of a fundamental frequency component and a temperature amplitude of a second harmonic component by using two quadratic curves, and a fatigue limit stress of an object to be measured is obtained on the basis of an intersection of the two quadratic curves. This enables the fatigue limit stress of the object to be measured to be precisely obtained.

BRIEF DESCRIPTION OF DRAWINGS

FIG. 9 is a diagram for explaining a method for obtaining a first approximate line and a second approximate line.

FIG. 12A is a diagram explaining inappropriate data that is measured in a case of a large load amplitude.

FIG. 12B is a diagram explaining inappropriate data that is measured in a case of a large load amplitude.

FIG. 12C is a diagram illustrating a formula for calculating a degree-of-freedom adjusted determination coefficient.

FIG. 15 is a diagram illustrating a comparison between a fatigue limit stress obtained by using a method according to the first exemplary embodiment and a fatigue limit stress obtained by using a conventional method (a radius of a cutout of a test piece: 5.0 mm).

FIG. 16 is a diagram illustrating a comparison between a fatigue limit stress obtained by using the method according to the first exemplary embodiment and a fatigue limit stress obtained by using the conventional method (a radius of a cutout of a test piece: 2.0 mm).

DESCRIPTION OF EMBODIMENTS

Exemplary embodiments are described below in detail with reference to the drawings as appropriate. An unnecessarily detailed description may be omitted. For example, a detailed description of a well-known matter and a duplicated description of substantially the same configuration may be omitted. This is to avoid unnecessary redundancy in the description below and to make the description below easily understandable to those skilled in the art.

Note that the inventors provide the accompanying drawings and the description below to help those skilled in the art to fully understand the present disclosure, and do not intend to use the accompanying drawings or the description below to limit the subject matter described in the claims.

First Exemplary Embodiment

[1-1. Configuration]

An exemplary embodiment of a fatigue limit stress specification system according to the present disclosure is described below with reference to the accompanying drawings. A fatigue limit stress specification system described in the exemplary embodiment below is a system that calculates a fatigue limit stress of a test piece.

Figure 1A:
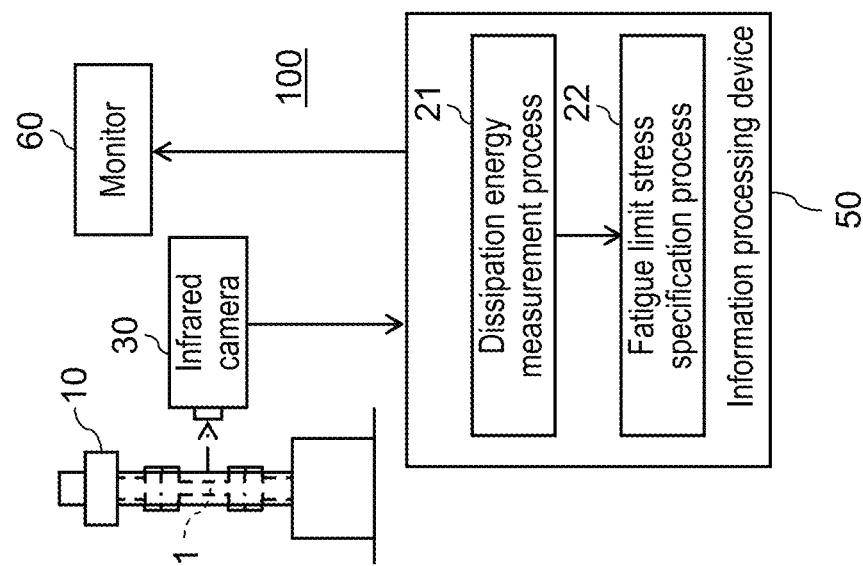
FIG. 1A is a diagram illustrating a configuration of a fatigue limit stress specification system according to a first exemplary embodiment of the present disclosure.

FIG. 1A is a diagram illustrating a fatigue limit stress specification system according to an exemplary embodiment of the present disclosure. Fatigue limit stress specification system 100 includes vibration generator 10, infrared camera 30 (an example of a temperature sensor according to the present disclosure), information processing device 50 (an example of a fatigue limit stress specification device according to the present disclosure), and monitor 60. Vibration generator 10 vibrates test piece 1 serving as an object to be measured. Infrared camera 30 captures a temperature image (an infrared image) of test piece 1. Information processing device 50 analyzes the temperature image, and calculates a fatigue limit of test piece 1. Specifically, information processing device 50 performs dissipation energy measurement process 21 and fatigue limit stress specification process 22 (details are described later in [1-2. Operation]). Monitor 60 displays predetermined information.

Figure 1B:
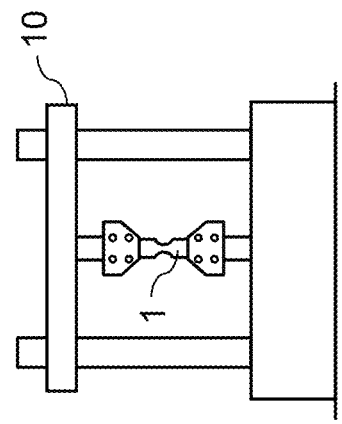
FIG. 1B is a diagram illustrating a state where a test piece is fixed to a vibration generator.

FIG. 1B is a diagram illustrating a state where test piece 1 is fixed to vibration generator 10. Vibration generator 10 is a device that applies a predetermined force to test piece 1 at a predetermined frequency.

Note that measurement data referred to in the description below is data that has been measured by using, as vibration generator 10, a hydraulic servo fatigue testing machine (from Shimadzu Corporation, a servopulser, a maximum testing capacity: 10 kN). A temperature image of test piece 1 was measured by using infrared camera 30 while a tensile load applied to test piece 1 was increased by 0.1 kN at a time from 0 kN to 8.5 KN under the load control of vibration generator 10. Fundamental frequency (1$f$) in vibration was assumed to be 25 Hz. Silver 480M from Cedip Infrared Systems was used as infrared camera 30. A frame rate of infrared camera 30 is 249 Hz.

Data processing is performed on the temperature image measured by infrared camera 30 in information processing device 50 having a Fourier transform function. Information processing device 50 analyzes the temperature image (an infrared image) that has been captured by infrared camera 30, and specifies a fatigue limit stress of test piece 1. Monitor 60 is connected to information processing device 50. Monitor 60 is a liquid crystal display device or an organic electroluminescence (EL) display device.

Figure 2:
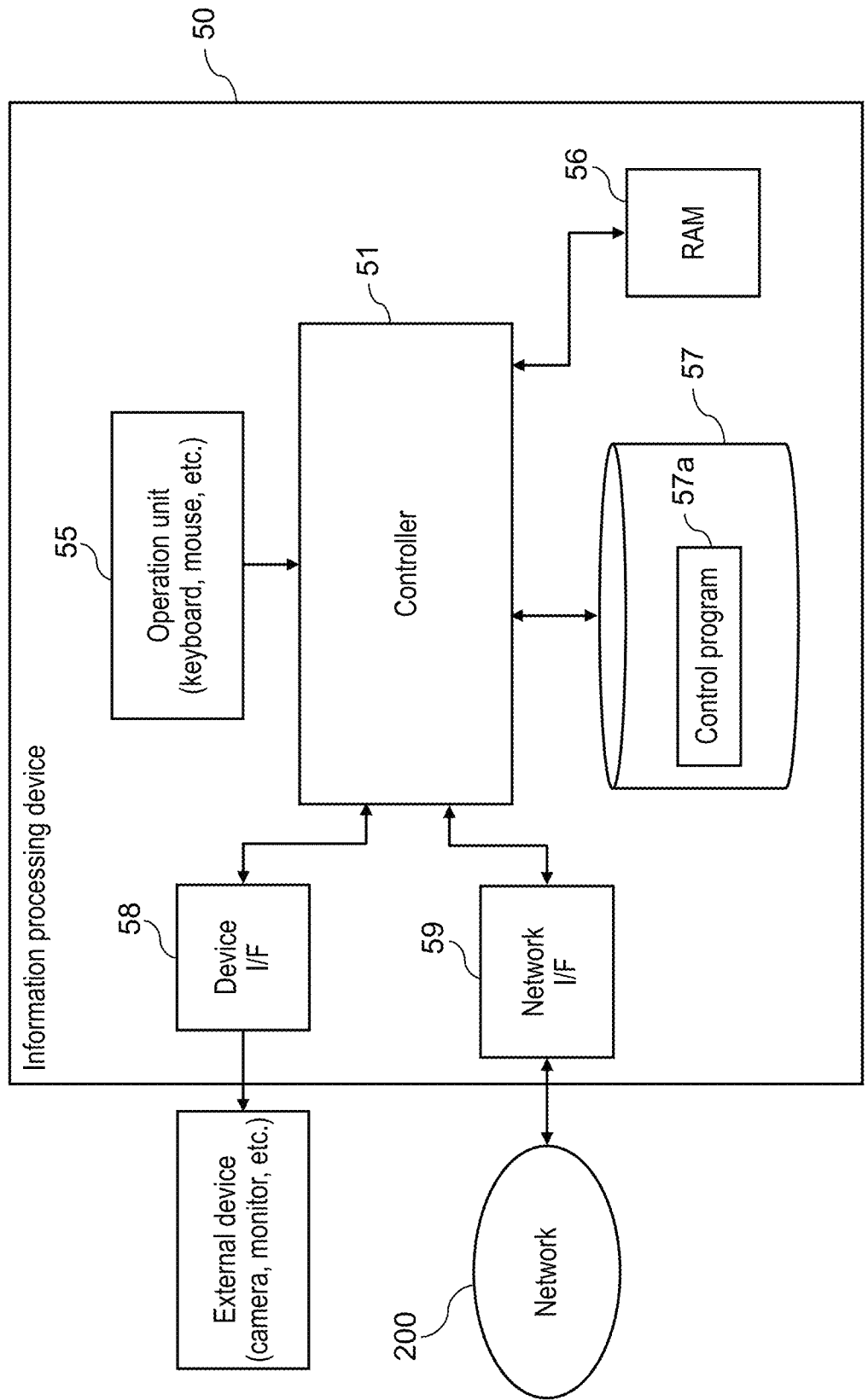
FIG. 2 is a block diagram illustrating a configuration of an information processing device according to the first exemplary embodiment.

FIG. 2 is a block diagram explaining an internal configuration of information processing device 50. Information processing device 50 is, for example, a personal computer. Information processing device 50 includes controller 51 that controls an entire operation of information processing device 50, operation unit 55 that is used for a user to perform an operation, random access memory (RAM) 56 that stores data or a program, and data storage 57.

Information processing device 50 further includes device interface 58 (an example of an obtaining unit according to the present disclosure) for connection to an external device such as infrared camera 30 (FIG. 1A) or monitor 60 (FIG. 1A), and network interface 59 (an example of the obtaining unit according to the present disclosure) for connection to a network. Device interface 58 is a communication module (a circuit) that communicates data or the like according to universal serial bus (USB), high definition multimedia interface (HDMI) (registered trademark), IEEE 1394, or the like. Network interface 59 is a communication module (a circuit) that performs data communication according to standards such as IEEE 802.11, WiFi, Bluetooth (registered trademark), or the like.

Controller 51 (an example of an arithmetic unit according to the present disclosure) is configured by a central processing unit (CPU) or a micro processing unit (MPU), and realizes a predetermined function by executing predetermined control program 57$a$ that is stored in data storage 57. The control program executed by controller 51 may be provided via network 200, or may be provided via a recording medium such as a compact disc read-only memory (CD-ROM).

RAM 56 is a storage element that transitorily stores a program or data, and functions as a working area of controller 51.

Data storage 57 is a recording medium that stores a parameter, data, and a program that are needed to realize functions, and data storage 57 stores a control program that is executed by controller 51 or various pieces of data. Data storage 57 is configured, for example, by a hard disk drive (HDD), a solid state drive (SSD), or an optical disk medium. Control program 57$a$ is installed in data storage 57. Controller 51 realizes the functions described later by executing control program 57$a$ described above. Data storage 57 also functions as a working area of controller 51.

Figure 3:
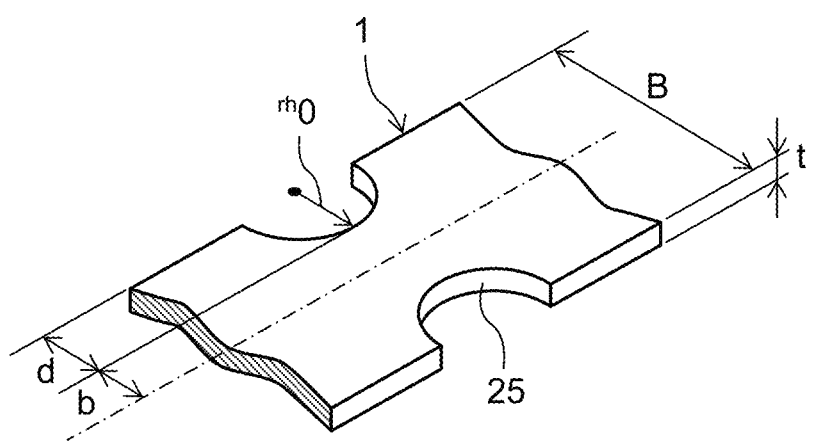
FIG. 3 is a diagram illustrating a shape and dimensions of test piece 1b that has radius of curvature rh0 and serves as an object to be measured according to the first exemplary embodiment of the present disclosure.

FIG. 3 is a diagram explaining test piece 1 serving as an object to be measured. Test piece 1 is a strip-shaped member having width B and thickness t, and notch 25 is formed in a center in a length direction, and a depth of notch 25 increases toward a center from both sides. A radius of curvature of notch 25 is rh0. Depth d of notch 25 is half as long as a width of a minimum width portion of notch 25 that serves as a stress concentration part. Length b is a length from a center in a width direction of notch 25 to a deepest portion of the notch. Length b is equal to depth d of notch 25.

[1-2. Operation]

An operation of fatigue limit stress specification system 100 configured as described above is described below. In fatigue limit stress specification system 100, information processing device 50 (controller 51) performs dissipation energy measurement process 21 and fatigue limit stress specification process 22.

A principle of dissipation energy measurement is described. Test piece 1 that has received a repeated load has a repeated temperature change having the same frequency as a vibration frequency of vibration generator 10 due to a thermoelastic effect. In addition, test piece 1 that has received the repeated load has an increase in average temperature due to energy dissipation inside a material. A change in temperature due to the thermoelastic effect and an increase in average temperature due to dissipation energy are smaller than a change in temperature that is generated due to an external factor such as wind or a change in ambient temperature. Therefore, temperature change amount ΔT of test piece 1 is expressed as described below (formula 1).

$$\Delta T = re - Tc + D + Te \quad (1)$$

ΔT: temperature change amount re: external factor (wind or a change in ambient temperature)

Tc: conduction of heat (a uniforming action of a portion having a high temperature and a portion having a low temperature)

D: dissipation energy (an amount of an increase in temperature in a repetition cycle)

Te: thermoelastic effect

In actual measurement of dissipation energy, information processing device 50 measures a temperature of test piece 1 by using infrared camera 30, and simultaneously fetches a synchronizing input signal serving as a control signal from vibration generator 10. Then, information processing device 50 performs infrared stress image processing using Fourier transform on a specified frequency component based on the synchronizing input signal. By doing this, information processing device 50 eliminates an influence of the external factor by extracting a temperature change amount component that corresponds to the vibration frequency, and measures a change in temperature due to the thermoelastic effect that has been generated by vibrating test piece 1.

When an amount of an increase in temperature due to dissipation energy inside a material based on a mechanical phenomenon in each smaller repetition cycle is separated from an increase in temperature and a decrease in temperature due to the thermoelastic effect and measurement is performed, a measurement image of dissipation energy D of an amount of an increase in temperature in the repetition cycle is obtained. A fatigue limit stress of test piece 1 is calculated from the measurement image of dissipation energy D.

Processing for specifying a fatigue limit stress is described with reference to the flowchart illustrated in FIG. 4. This processing is principally performed by controller 51 of information processing device 50.

Controller 51 first specifies a pixel to be used when a fatigue limit stress is obtained on the basis of an image captured by infrared camera 30 (step S11). The process of step S11 is described below in detail.

Figure 5A:
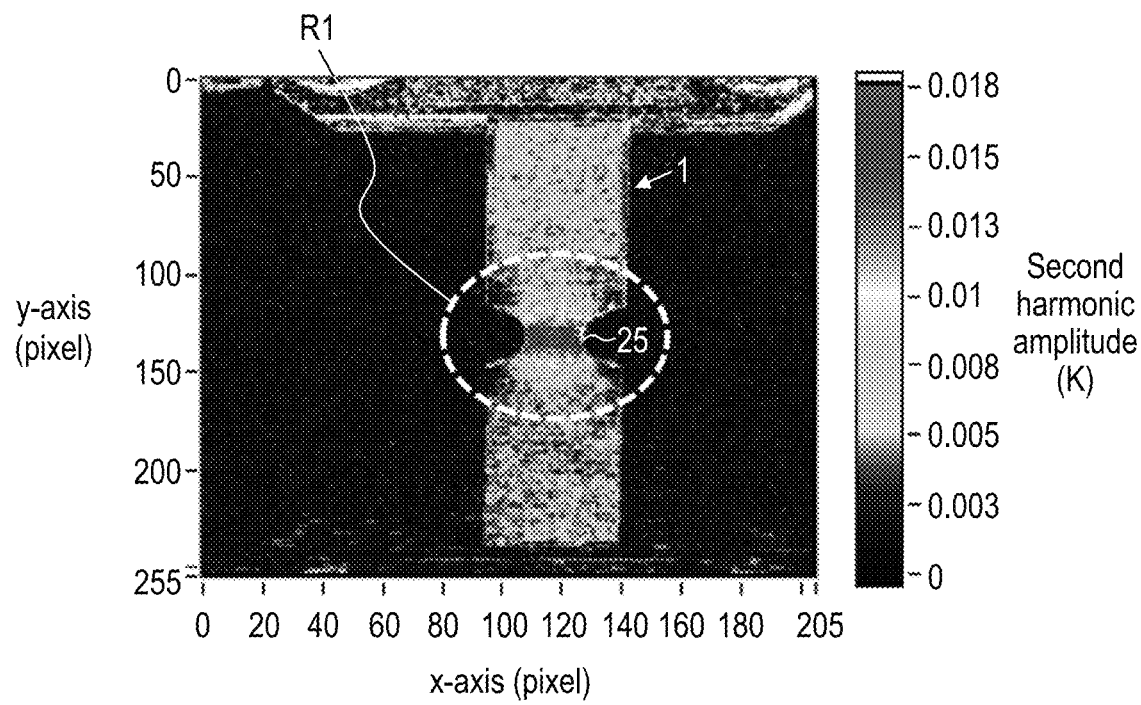
FIG. 5A is a diagram illustrating a temperature amplitude image distribution for a second harmonic component.
Figure 5B:
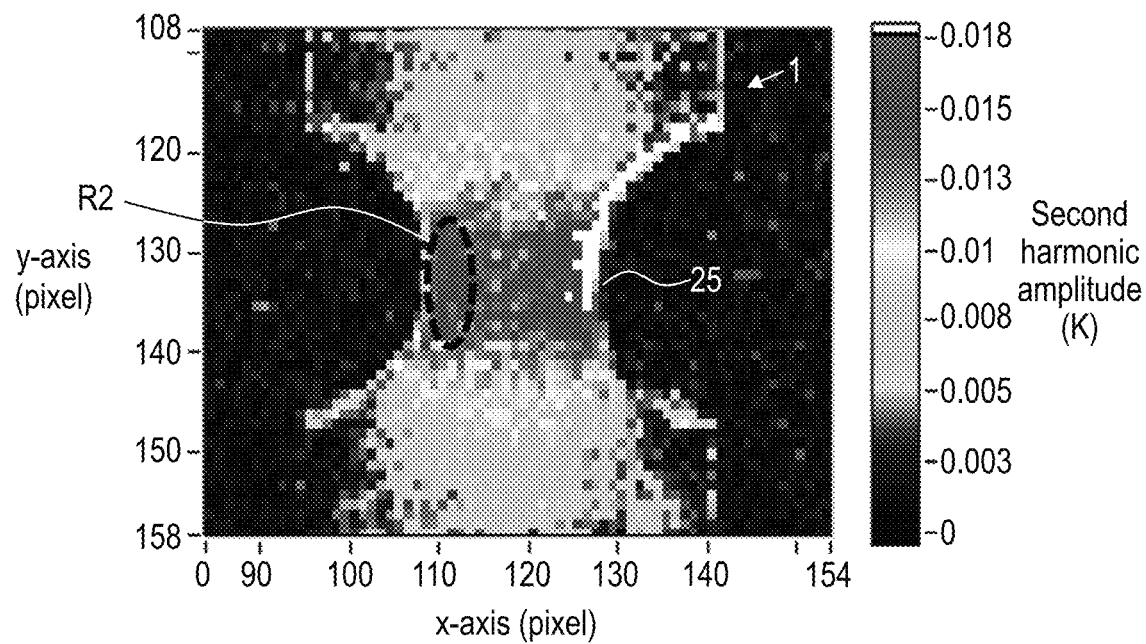
FIG. 5B is an enlarged view of a portion of region R1 in FIG. 4A.

FIG. 5A is a diagram illustrating an image that is obtained from the image captured by infrared camera 30 and is used to measure dissipation energy of test piece 1. FIG. 5B is an enlarged view of a portion of broken-line region R1 in FIG. 5A. FIGS. 5A and 5B are diagrams illustrating an image of a temperature amplitude (hereinafter referred to as a "second harmonic amplitude") of a component (hereinafter referred to as a "second harmonic component") of frequency 2$f$ (hereinafter referred to as "second harmonics") that is twice fundamental frequency 1$f$ of vibration.

When FIGS. 5A and 5B are referred to, a portion where the second harmonic amplitude has remarkably increased can be observed near notch 25 of test piece 1. Controller 51 specifies pixels inside region R2 that includes the portion where the second harmonic amplitude has increased.

Then, controller 51 generates a graph of a temperature amplitude of a fundamental frequency (hereinafter referred to as a "fundamental wave amplitude") in vibration with respect to a load amplitude for each of the pixels inside region R2 that has been specified, and controller 51 obtains an inclination of the graph. A pixel for which the graph has a maximum inclination (inclination=amount of change in fundamental wave amplitude/amount of change in load amplitude) is a pixel that has a maximum main stress sum and corresponds to a maximum stress concentration part. Therefore, by selecting a pixel for which a graph of the load amplitude and the temperature amplitude of the fundamental frequency (the fundamental wave amplitude) due to vibration has a maximum inclination from among pixels inside region R2 where the second harmonic amplitude is relatively large, a pixel that corresponds to a position where both fatigue damage and stress concentration have occurred can be selected.

This processing is performed as the following by controller 51 in dissipation energy measurement process 21.

Step 1: Generate a distribution image of a temperature amplitude of a second harmonic component (a second harmonic amplitude) for each load amplitude on the basis of an image captured by infrared camera 30.

Step 2: Specify region R2 that serves as a region where the temperature amplitude of the second harmonic component (the second harmonic amplitude) is relatively large in a region of test piece 1.

Step 3: Generate a graph of a temperature amplitude of a vibration frequency (a fundamental wave amplitude) with respect to a load amplitude for all of the pixels in region R2 that has been specified.

Step 4: Determine a pixel for which the graph obtained in step 3 has a maximum inclination as a pixel to be used to specify a fatigue limit stress.

When a pixel to be used to specify the fatigue limit stress is determined in step S11, as described above, controller 51 performs fatigue limit stress specification process 22. Specifically, controller 51 generates a graph of the second harmonic amplitude with respect to the fundamental wave amplitude (see FIG. 8C) for the specified pixel (step S12). The process of step S12 is described below in detail.

Figure 6A:
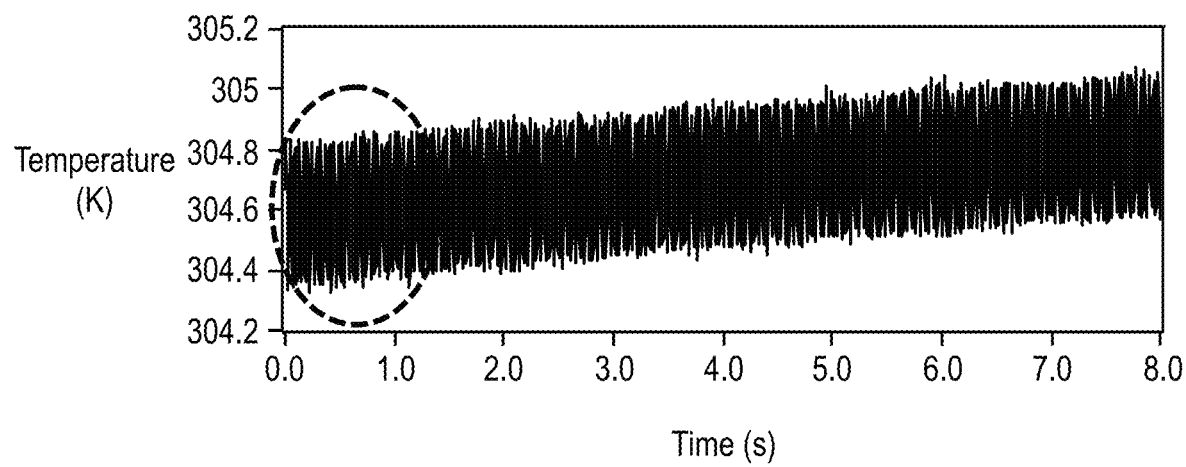
FIG. 6A is a diagram illustrating a change in temperature of a test piece during vibration generation.
Figure 6B:
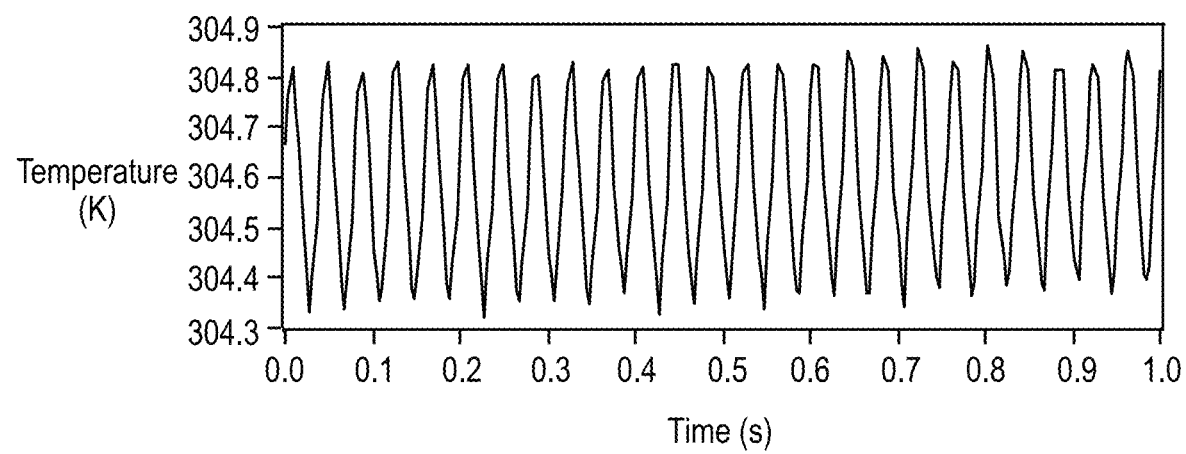
FIG. 6B is an enlarged view of a broken-line region in FIG. 6A.

FIG. 6A is a diagram that is obtained by analyzing an image of infrared camera 30 and that illustrates a change in temperature with respect to time of test piece 1 due to vibration. FIG. 6B is an enlarged view of a broken-line region in FIG. 6A. FIGS. 6A and 6B illustrate a measurement result at a time when vibration is applied to a test piece having a radius of a cutout rh0 of 5.0 mm at a load amplitude of 7.0 kN and a vibration frequency of 25 Hz.

Figure 7A:
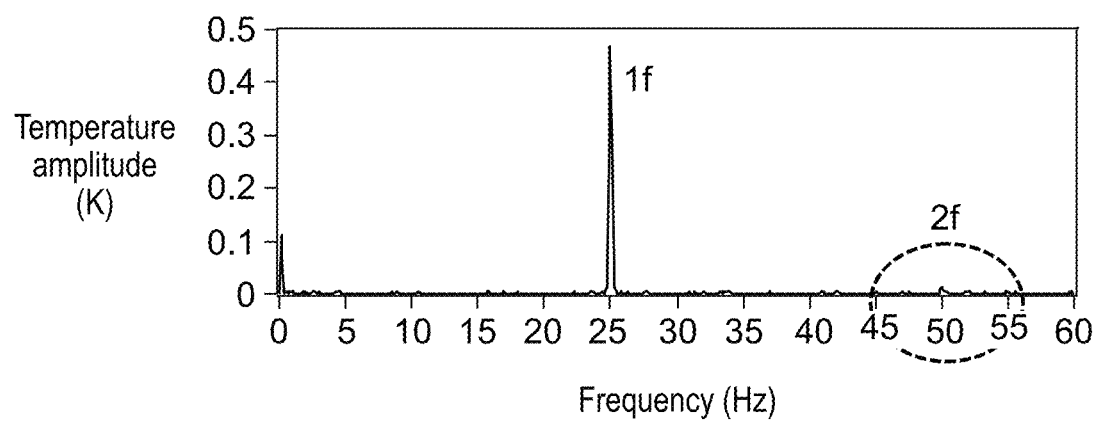
FIG. 7A is a diagram illustrating a frequency spectrum of a change in temperature.
Figure 7B:
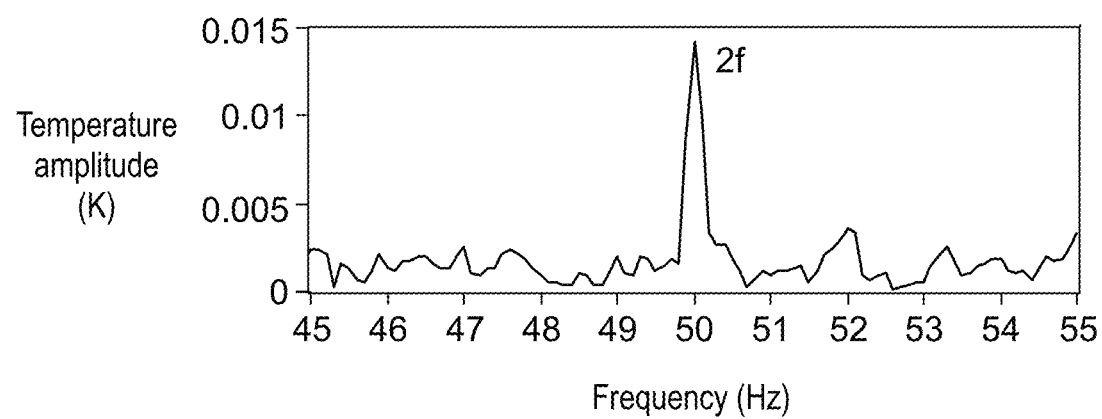
FIG. 7B is an enlarged view of a broken-line region in FIG. 7A.

By performing Fourier transform on data of a change in temperature with respect to time, as illustrated in FIGS. 6A and 6B, a frequency spectrum with respect to a temperature amplitude, as illustrated in FIG. 7A, can be obtained. FIG. 7B is an enlarged view of a broken-line region in FIG. 7A. In this frequency spectrum, a temperature amplitude of fundamental frequency component (1$f$) a fundamental wave amplitude) and a temperature amplitude of second harmonic component (2$f$) a second harmonic amplitude) are focused on.

Figure 8A:
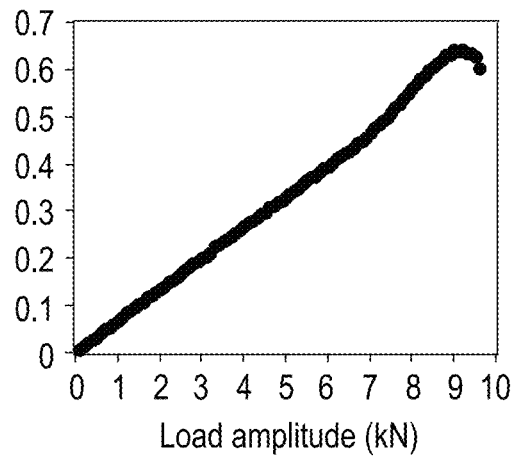
FIG. 8A is a diagram illustrating a relation between a load amplitude and a fundamental wave amplitude.
Figure 8B:
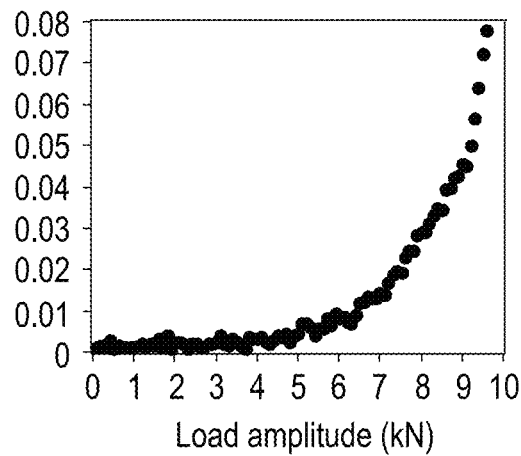
FIG. 8B is a diagram illustrating a relation between the load amplitude and a second harmonic amplitude.
Figure 8C:
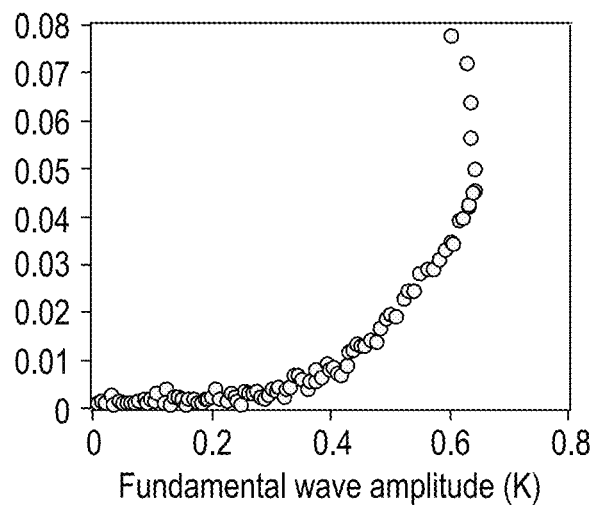
FIG. 8C is a diagram illustrating a relation between the fundamental wave amplitude and the second harmonic amplitude.

Fundamental wave amplitude (1$f$) and second harmonic amplitude (2$f$) are obtained for each of a plurality of load amplitudes. By doing this, a graph of fundamental wave amplitude (1$f$) with respect to the load amplitude, as illustrated in FIG. 8A, and a graph of second harmonic amplitude (2$f$) with respect to the load amplitude, as illustrated in FIG. 8B, are obtained. Then, a graph of the second harmonic amplitude with respect to the fundamental wave amplitude (an example of a relation according to the present disclosure), as illustrated in FIG. 8C, is generated from the graph of the fundamental wave amplitude with respect to the load amplitude (see FIG. 8A) and the graph of the second harmonic amplitude with respect to the load amplitude (see FIG. 8B).

Figure 4:
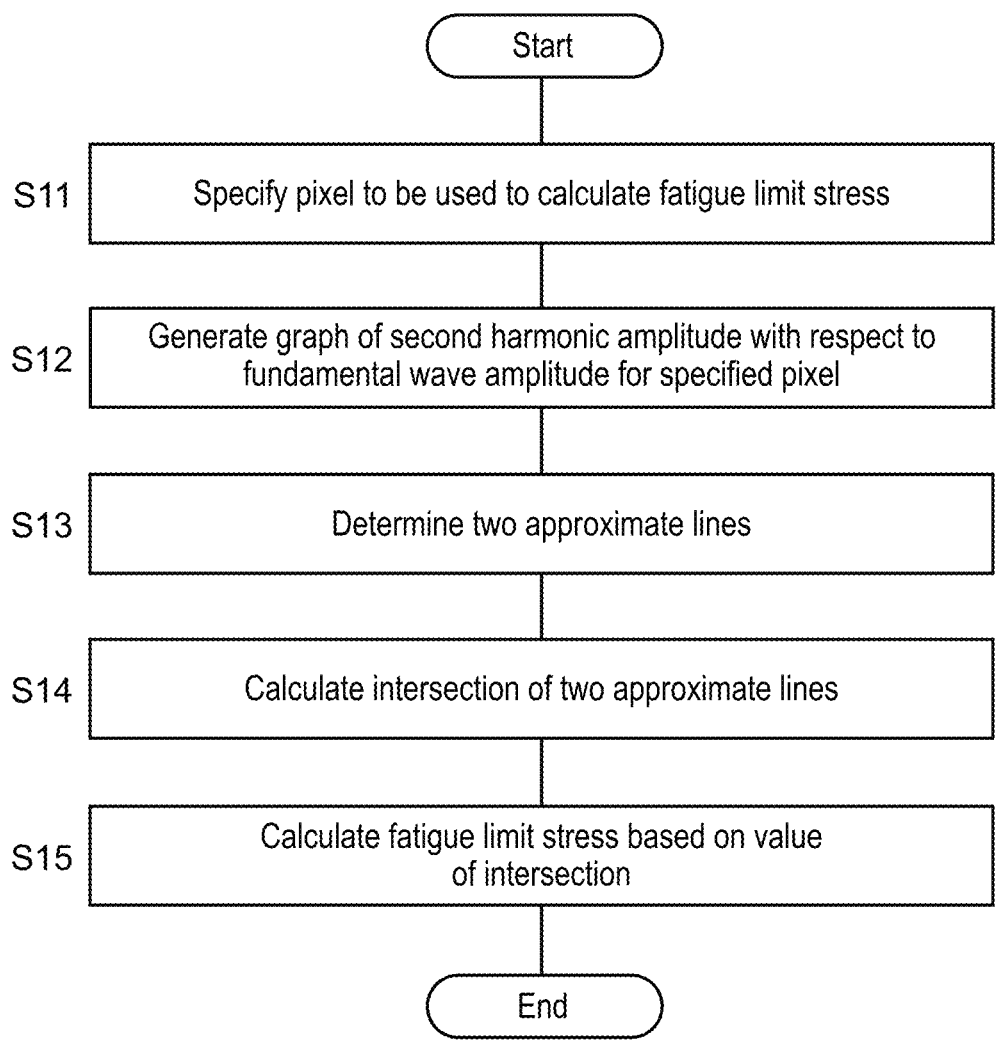
FIG. 4 is a flowchart illustrating processing for specifying a fatigue limit stress.

Return now to the flowchart of FIG. 4. Controller 51 determines two approximate lines with respect to the graph of the second harmonic amplitude with respect to the fundamental wave amplitude (see FIG. 8C) (step S13). Stated another way, as illustrated in FIG. 9, two approximate lines (first approximate line L1 and second approximate line L2) are obtained that fit a relation between the fundamental wave amplitude and the second harmonic amplitude. Details of the process of step S13 are described later.

When first approximate line L1 and second approximate line L2 are determined, controller 51 calculates an intersection of first approximate line L1 and second approximate line L2 (step S14). A fatigue limit stress is determined on the basis of the intersection (step S15). Details of the processes of step S14 and step S15 are described later. A fatigue limit stress of test piece 1 is obtained as described above.

Details of the processes of step S13 to step S15 described above are described below.

First, the process of step S13 is described in detail. In the present exemplary embodiment, as illustrated in FIG. 9, boundary B is set in a region of the fundamental wave amplitude, and first approximate line L1 and second approximate line L2 are set in a region below boundary B and a region above boundary B. Here, first approximate line L1 and second approximate line L2 are expressed by quadratic curves (quadratic functions), as indicated as the following formulae.

First approximate line $L1$ (range below boundary $B$):
$$y=ax^2+b \qquad (2)$$

Second approximate line $L2$ (range above boundary $B$): $y=ax^2+cx+d \qquad (3)$ Here, x is a fundamental wave amplitude, and y is a second harmonic amplitude. In addition, a, b, c, and d≠0 is established.

First approximate line L1 with respect to the range below boundary B is formed by a quadratic term of the fundamental wave amplitude and a constant term, and is a polynomial that does not include a liner term. In contrast, second approximate line L2 with respect to the range above boundary B is a polynomial that is formed by a quadratic term and a linear term of the fundamental wave amplitude and a constant term. Second approximate line L2 is determined by fitting approximate line L2 ($y=ax^2+cx+d$) within the range above boundary B by using constant a that has been determined by first approximate line L1 ($y=ax^2+b$) so as to obtain c and d. Alternatively, second approximate line L2 may be determined by fitting a straight line (y=cx+d') to data obtained by subtracting a value of an extended line ($y=ax^2+b$) of first approximate line L1 from data within the range above boundary B, within the range above boundary B so as to obtain c and d' ($y=ax^2+cx+b+d'=ax^2+cx+d$).

The inventors of the present application have examined a load signal, a displacement signal, and a strain signal that are output from a load cell, an actuator, and a strain gauge in load amplitude control, and have discovered that the load signal includes a second harmonic component. Accordingly, the inventors of the present application have considered that a complete sine-wave load waveform is not necessarily added to test piece 1 and a distortion is generated in a load waveform in a process of controlling a load. In addition, it has been confirmed that the displacement signal and the strain signal also include the second harmonic component. This is considered to be an influence of the second harmonic component included in the load signal. Further, it is considered that the second harmonic component results from a dark current generated from a sensor of an infrared camera or noise from an ambient environment in some cases. The inventors of the present application have considered that a second harmonic component of temperature includes a second harmonic component (first approximate line L1 and an extended line of first approximate line L1) that has been generated due to the causes described above. Based on these findings, the inventors of the present application have performed fitting by using first approximate line L1 and second approximate line L2 serving as quadratic curves (quadratic functions), as indicated as formulae (2) and (3), and a fatigue limit stress has been precisely obtained.

Processing for determining first approximate line L1 and second approximate line L2 from a graph of a second harmonic amplitude with respect to a fundamental wave amplitude (see FIG. 8C) is described with reference to the flowchart of FIG. 10.

Figure 11A:
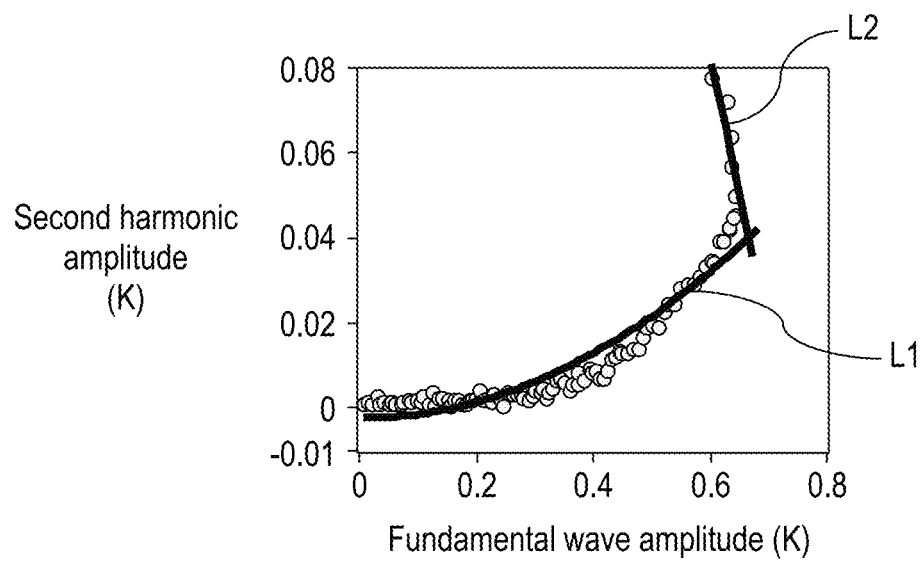
FIG. 11A is a diagram illustrating a relation between a fundamental wave amplitude and a second harmonic amplitude.

First, controller 51 (see FIG. 2) sets boundary B (see FIG. 9) to be a start point (step S21). Then, first approximate line L1 and second approximate line L2 are obtained with respect to boundary B that has been set, by using measurement data within an entire range (step S22). Specifically, as illustrated in FIG. 11A, fitting is performed on data in a region below boundary B by using first approximate line L1, fitting is performed on data in a region above boundary B by using second approximate line L2, and a coefficient of first approximate line L1 and second approximate line L2 is obtained in such a way that a residual sum of squares of a measurement value and a calculation value becomes minimum.

A range in which boundary B is moved has been set in advance. Until boundary B finishes being moved over an entirety of a predetermined range that has been set in advance, controller 51 obtains first approximate line L1 and second approximate line L2 for each of the boundaries (step S22) while changing a position of boundary B in stages, as illustrated in FIG. 9 (NO in step S23, step S30). When boundary B finishes being moved over the entirety of the predetermined range that has been set in advance (YES in step S23), one boundary is specified that causes a residual sum of squares calculated for first approximate line L1 and second approximate line L2 that have been obtained with respect to each of the boundaries to become minimum (step S24). By doing this, a boundary between a data range to which first approximate line L1 is applied and a data range to which second approximate line L2 is applied is specified.

Figure 11B:
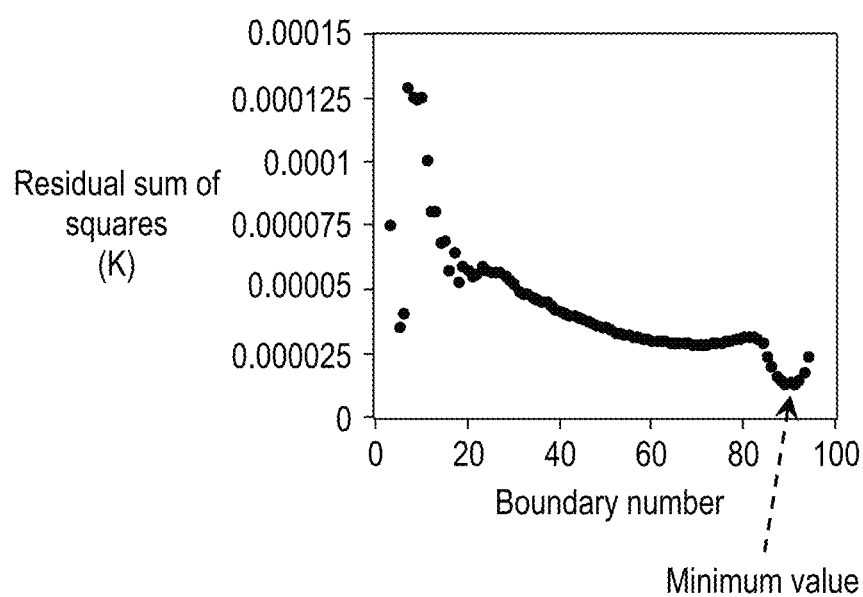
FIG. 11B is a diagram illustrating a residual sum of squares obtained for each boundary number.

FIG. 11B is a diagram illustrating a residual sum of squares calculated for each of the boundaries. A horizontal axis indicates a boundary number indicating a boundary, and the boundary number has a value that is proportional to a position of the boundary. In the example of the graph of FIG. 11B, a residual sum of squares becomes minimum at a boundary having the boundary number "92". Therefore, a position of the fundamental wave amplitude that corresponds to the boundary number "92" is specified as a boundary.

Figure 10:
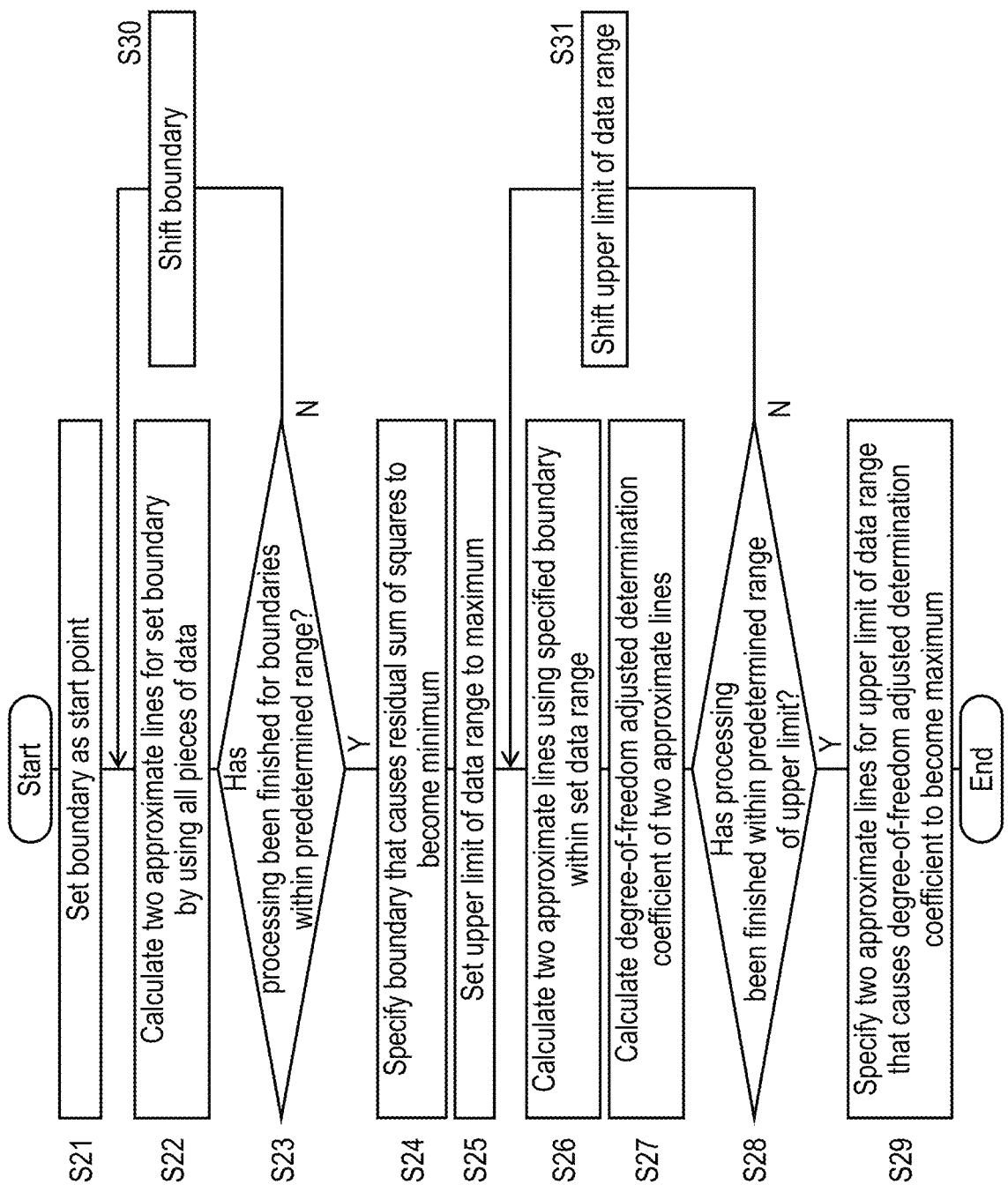
FIG. 10 is a flowchart illustrating processing for calculating the first approximate line and the second approximate line.

Return now to the flowchart of FIG. 10. When the boundary is determined, controller 51 determines an appropriate range (an upper limit) of data to be used to calculate a fatigue limit stress (step S25 to step S28 and step S31).

In a range in which a load amplitude is large, data that is inappropriate to be used to calculate the fatigue limit stress is included in measurement data, as indicated in broken-line region R11 and broken-line region R12 of FIGS. 12A and 12B. It is considered that this results from the generation or development of a microcrack, the generation of strain-induced martensitic transform, or the like. Accordingly, in the present exemplary embodiment, an upper limit of a data range is set by using a degree-of-freedom adjusted determination coefficient in order to remove the data that is inappropriate to be used to calculate the fatigue limit stress, such as data included in broken-line region R11 and broken-line region R12.

Therefore, controller 51 first sets the upper limit of the data range to a maximum value (step S25). Stated another way, the data range is set to include all pieces of data. Then, first approximate line L1 and second approximate line L2 are calculated on the basis of the boundary that has been specified in advance, by using data within the set data range (step S26). Stated another way, first approximate line L1 and second approximate line L2 that cause a residual sum of squares to become minimum are calculated by using the data within the set data range.

Next, controller 51 calculates a degree-of-freedom adjusted determination coefficient for first approximate line L1 and second approximate line L2 that have been calculated (step S27). The degree-of-freedom adjusted determination coefficient is calculated according to the formula illustrated in FIG. 12C.

Here, a range in which the upper limit of the data range is changed has been determined in advance. Until the upper limit of the data range finishes being changed within the range that has been determined in advance, the upper limit of the data range is changed (NO in step S28, step S31). Then, first approximate line L1 and second approximate line L2 are obtained for a new data range (step S26). Further, a degree-of-freedom adjusted determination coefficient for the first approximate line and second approximate line L2 are calculated (step S27). The upper limit of the data range is changed by shifting the upper limit of the data range by one piece of data at a time in a descending order of the second harmonic amplitude in such a way that the data range is narrowed.

Figure 13A:
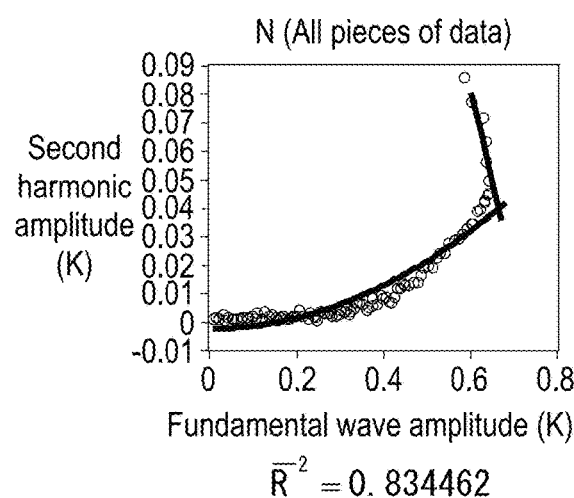
FIG. 13A is a diagram explaining a result of performing fitting on N data ranges.
Figure 13B:
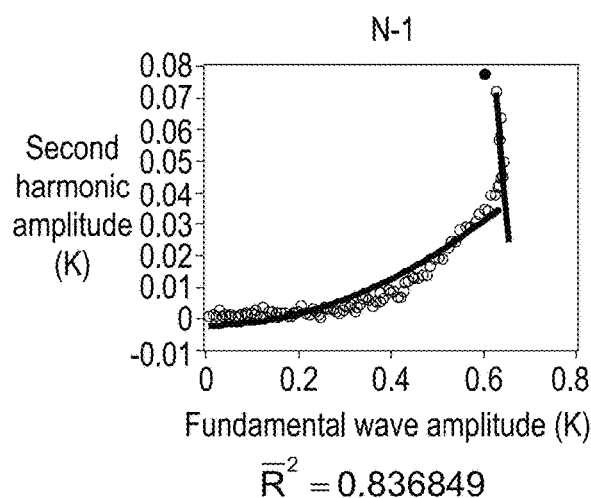
FIG. 13B is a diagram explaining a result of performing fitting on N-1 data ranges.
Figure 13C:
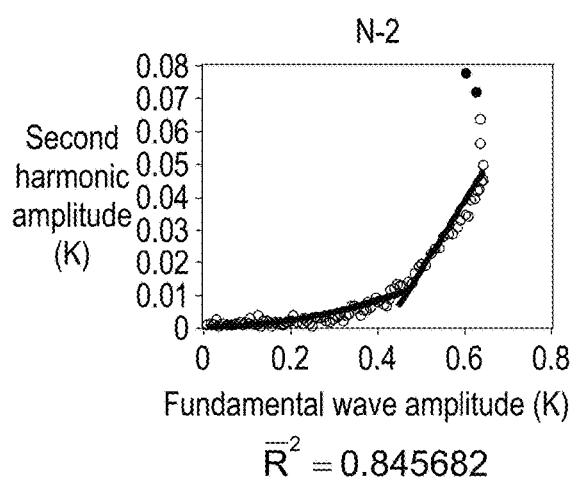
FIG. 13C is a diagram explaining a result of performing fitting on N-2 data ranges.
Figure 13D:
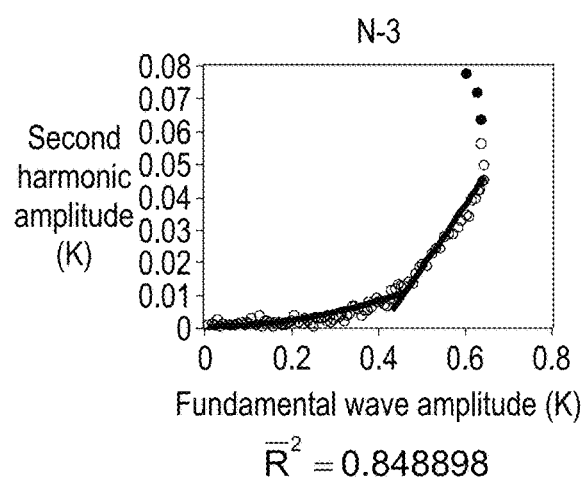
FIG. 13D is a diagram explaining a result of performing fitting on N-3 data ranges.
Figure 13E:
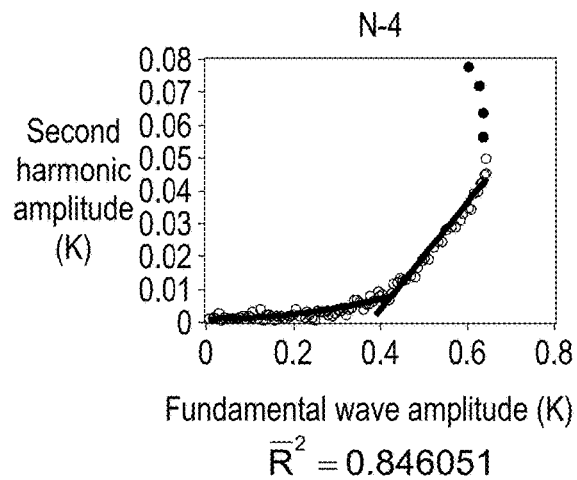
FIG. 13E is a diagram explaining a result of performing fitting on N-4 data ranges.
Figure 13F:
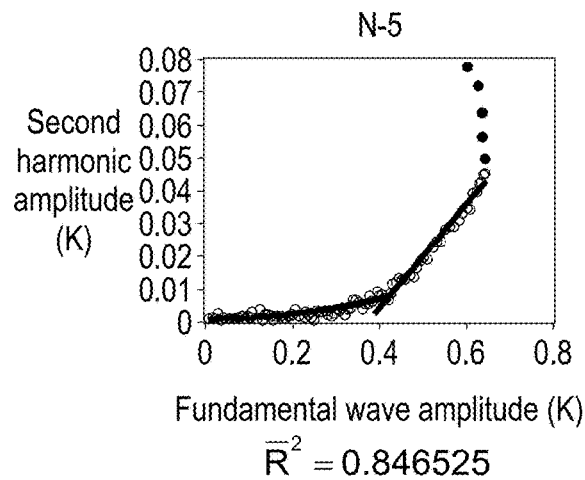
FIG. 13F is a diagram explaining a result of performing fitting on N-5 data ranges.
Figure 13G:
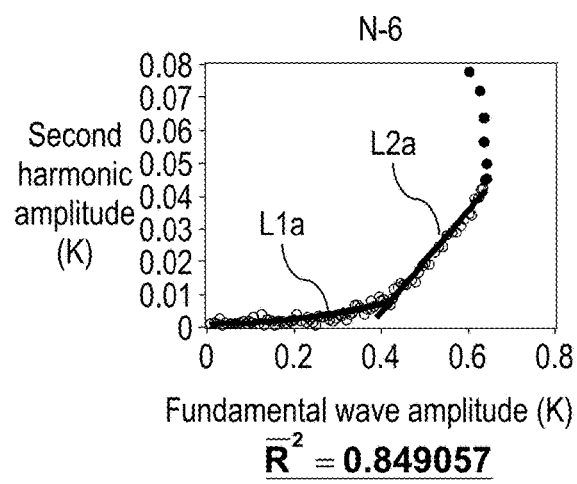
FIG. 13G is a diagram explaining a result of performing fitting on N-6 data ranges.
Figure 13H:
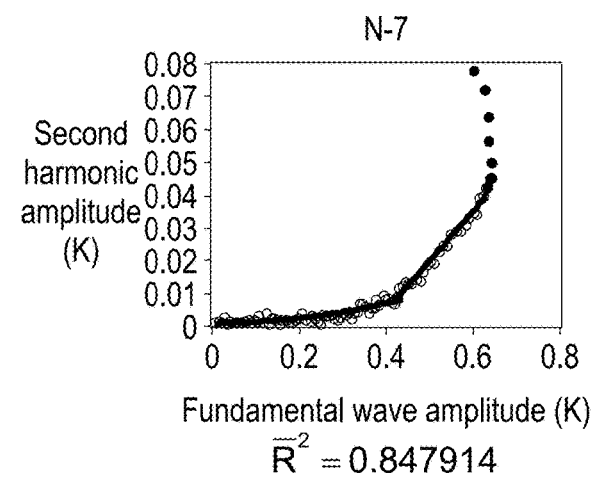
FIG. 13H is a diagram explaining a result of performing fitting on N-7 data ranges.

FIGS. 13A to 13H are diagrams illustrating a change in first approximate line L1, second approximate line L2, and a degree-of-freedom adjusted determination coefficient that have been calculated while the upper limit of the data range is changed by one piece of data at a time. FIG. 13A is a diagram illustrating a result of fitting approximate lines and a value of a degree-of-freedom adjusted determination coefficient with respect to all pieces of data at a time when the upper limit of the data range is set to a maximum (N pieces of data). FIG. 13B is a diagram illustrating a result of fitting approximate lines and a value of a degree-of-freedom adjusted determination coefficient at a time when the upper limit has been shifted by one piece of data from an upper limit in the case of all pieces of data, namely, with respect to N-1 pieces of data. FIG. 13C is a diagram illustrating a result of fitting approximate lines and a value of a degree-of-freedom adjusted determination coefficient at a time when the upper limit has been shifted by two pieces of data, namely, with respect to N-2 pieces of data. FIGS. 13D to 13H sequentially illustrate a result of fitting approximate lines that have similarly been obtained while the upper limit of the data range is changed by one piece of data at a time and a value of a degree-of-freedom adjusted determination coefficient.

When the upper limit of the data range completes being changed within the predetermined range has been completed (YES in step S28), controller 51 specifies an upper limit of the data range at a time when the degree-of-freedom adjusted determination coefficient becomes maximum, and specifies first approximate line L1 and second approximate line L2 that have been calculated within a range of the specified upper limit of the data range (step S29). In the examples illustrated in FIGS. 13A to 13H, the degree-of-freedom adjusted determination coefficient becomes maximum ($R^2=0.849057$) in the case illustrated in FIG. 13G. Therefore, a position that has been shifted by 6 pieces of data from a position in the case of all pieces of data is determined to be the upper limit of the data range, and first approximate line L1a and second approximate line L2a are specified.

As described above, first approximate line L1 and second approximate line L2 can be obtained from the graph of the second harmonic amplitude with respect to the fundamental wave amplitude (see FIG. 8C).

Figure 14A:
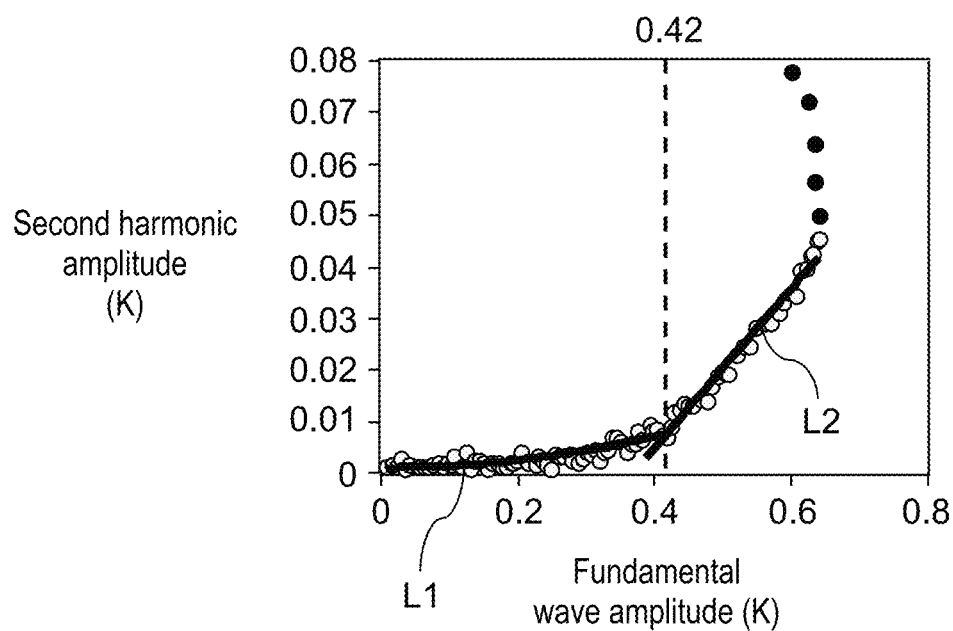
FIG. 14A is a diagram illustrating a relation between a fundamental wave amplitude and a second harmonic amplitude.
Figure 14B:
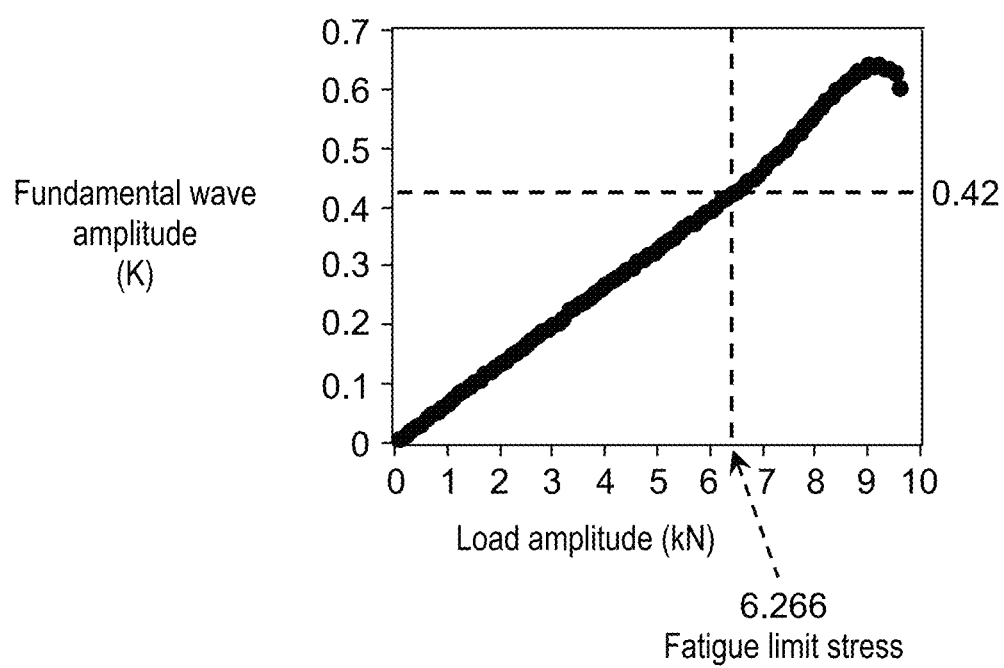
FIG. 14B is a diagram for explaining a method for calculating a fatigue limit on the basis of the data illustrated in FIG. 14A.

Next, the processes of step S14 and step S15 are described in detail. Controller 51 calculates a fatigue limit stress on the basis of an intersection of first approximate line L1 and second approximate line L2, as the following. When first approximate line L1 and second approximate line L2 are obtained, as illustrated in FIG. 14A, an intersection of first approximate line L1 and second approximate line L2 is obtained. In the example of FIG. 14A, 0.42 [K] is obtained as a value of a fundamental wave amplitude of the intersection of first approximate line L1 and second approximate line L2 (step S14). Then, controller 51 refers to a graph of the fundamental wave amplitude with respect to the load amplitude (see FIG. 14B), obtains the load amplitude value 6.266 [kN] on the basis of the fundamental wave amplitude value 0.42 [K] of the intersection, and determines this value to be a fatigue limit stress (step S15).

As described above, a fatigue limit stress of test piece 1 can be obtained.

Figure 17:
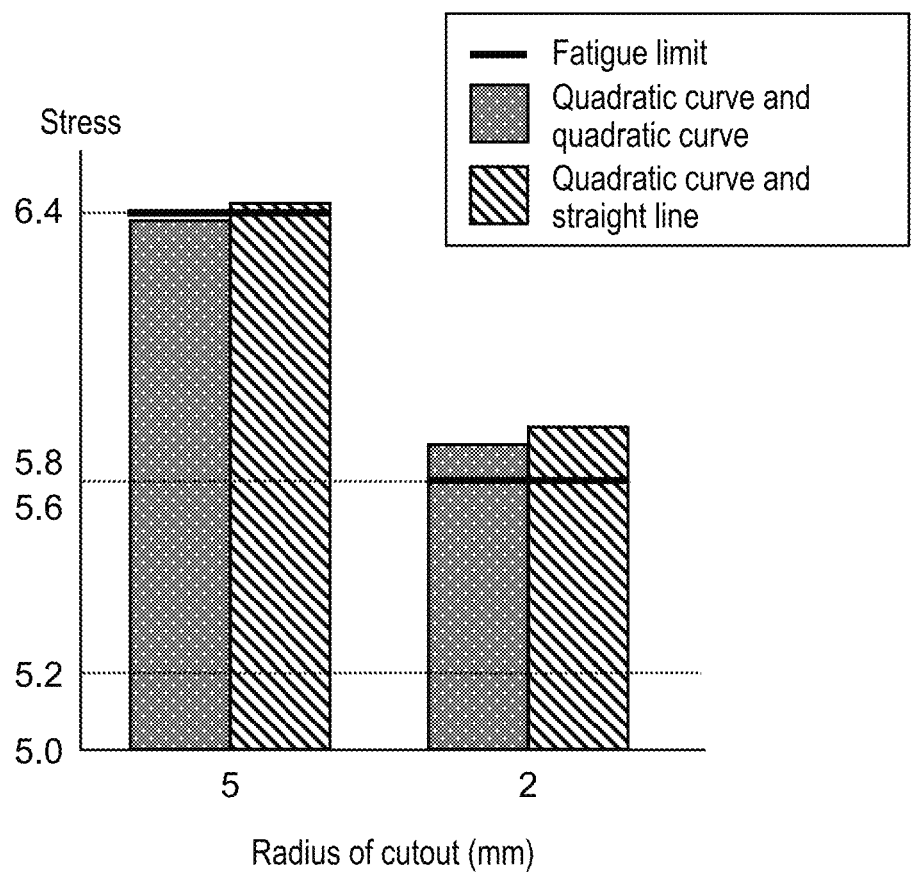
FIG. 17 is a diagram illustrating a comparison between a fatigue limit stress obtained by using the method according to the first exemplary embodiment and a fatigue limit stress obtained by using the conventional method.

FIGS. 15 to 17 are diagrams in which a fatigue limit stress obtained by using a method according to the first exemplary embodiment is compared with a fatigue limit stress obtained by using a conventional method. In the method according to the first exemplary embodiment, both a first approximate line and a second approximate line are assumed to be quadratic curves (quadratic functions). In contrast, in the conventional method, the first approximate line is assumed to be a quadratic curve (a quadratic function), and the second approximate line is assumed to be a straight line.

FIG. 15 illustrates a comparison between a fatigue limit stress obtained by using the method according to the first exemplary embodiment (in FIG. 15, illustrated as "quadratic curve and quadratic curve") and a fatigue limit stress value obtained by using the conventional method (in FIG. 15, illustrated as "quadratic curve and straight line") for five test pieces 1 having a radius of a cutout of 5.0 mm. A measurement value of a fatigue limit stress obtained in a fatigue test conducted on test piece 1 under the same condition was 6.4 kN. FIG. 16 illustrates fatigue limit stress values that have been obtained by using the method according to the first exemplary embodiment (in FIG. 16, illustrated as "quadratic curve and quadratic curve") and the conventional method (in FIG. 16, illustrated as "quadratic curve and straight line") for five test pieces 1 having a radius of a cutout of 2.0 mm. A measurement value of a fatigue limit stress obtained in a fatigue test conducted on test piece 1 under the same condition was 5.7 kN. Further, FIG. 17 illustrates a comparison between a fatigue limit stress obtained by using the method according to the first exemplary embodiment and a fatigue limit stress obtained by using the conventional method.

With reference to FIGS. 15 to 17, in both the case of a radius of a cutout of 5.0 mm (FIG. 15) and the case of a radius of a cutout of 2.0 mm (FIG. 16), a value of a fatigue limit stress closer to the value obtained in the fatigue test is obtained in a case where fitting is performed using a quadratic curve and a quadratic curve (the method according to the first exemplary embodiment) in comparison with a case where fitting is performed using a quadratic curve and a straight line (the conventional method).

As described above, information processing device 50 can obtain a fatigue limit stress of test piece 1 from a temperature image of an object to be measured to which each load that has been increased stepwise has been applied at a predetermined frequency.

[1-3. Advantageous Effects and Like]

As described above, fatigue limit stress specification system 100 according to the present exemplary embodiment measures a fatigue limit stress of test piece 1 (an example of an object to be measured according to the present disclosure) on the basis of a temperature amplitude that has been measured while a load that is made to act on test piece 1 is increased in stages. The temperature amplitude is generated with respect to a load in each of the stages. Fatigue limit stress specification system 100 includes vibration generator 10, infrared camera 30 (an example of a temperature sensor according to the present disclosure), and information processing device 50. Vibration generator 10 repeatedly applies the load to test piece 1 at a predetermined frequency. Infrared camera 30 obtains a change in temperature of test piece 1. Information processing device 50 obtains the fatigue limit stress of test piece 1 on the basis of the change in temperature of test piece 1 that has been obtained from infrared camera 30. Information processing device 50 obtains a relation between a temperature amplitude of a fundamental frequency component of vibration for test piece 1 and a temperature amplitude of a second harmonic component (the graph of FIG. 9), based on the change in temperature that has been obtained from infrared camera 30. Information processing device 50 performs fitting on the relation by using first approximate line L1 and second approximate line L2, first approximate line L1 including a quadratic curve, second approximate line L2 including a quadratic curve, and obtains a fatigue limit stress of the object to be measured on the basis of an intersection of first approximate line L1 and second approximate line L2.

In fatigue limit stress specification system 100 described above, quadratic curves are used for two approximate lines (first approximate line L1 and second approximate line L2) to be used for fitting. By doing this, in a fitting process, approximate lines can be obtained in consideration of an influence of a distortion of a waveform of a load or a distortion generated in a test piece that is generated in a process of controlling vibration, disturbance noise, or the like. Therefore, a fatigue limit stress can be precisely obtained.

First approximate line L1 is used to perform fitting on data within a range in which the temperature amplitude of the fundamental frequency component is below boundary B (an example of a predetermined value according to the present disclosure). Second approximate line L2 is used to perform fitting on data within a range in which the temperature amplitude of the fundamental frequency component is above boundary B.

First approximate line L1 is expressed as $y=ax^2+b$. Second approximate line L2 is expressed as $y=ax^2+cx+d$. x is the temperature amplitude of the fundamental frequency component. y is the temperature amplitude of the second harmonic component. a, b, c, and d are coefficients (a, b, c, and d≠0).

First approximate line L1 and second approximate line L2 are obtained by using a data range in a case where a maximum degree-of-freedom adjusted determination coefficient is obtained from among degree-of-freedom adjusted determination coefficients for the respective approximate lines in a plurality of data ranges. By doing this, a fatigue limit stress can be obtained by using data that is appropriate to calculate the fatigue limit stress. Therefore, the precision of specifying the fatigue limit stress can be improved.

In addition, the present disclosure provides a fatigue limit stress specification device that measures a fatigue limit stress of an object to be measured on the basis of a change in temperature of the object to be measured, the change in temperature being generated when the object to be measured (test piece 1) is vibrated while a load is increased stepwise. This fatigue limit stress specification device includes an obtaining unit and an arithmetic unit.

The obtaining unit obtains the change in temperature of the object to be measured. The arithmetic unit analyzes the change in temperature, and measures the fatigue limit stress of the object to be measured. The arithmetic unit obtains a relation between a temperature amplitude of a fundamental frequency component of vibration and a temperature amplitude of a second harmonic component, based on the change in temperature, and performs fitting on the relation by using a first approximate line and a second approximate line, the first approximate line including a quadratic curve, the second approximate line including a quadratic curve. The arithmetic unit obtains the fatigue limit stress of the object to be measured on the basis of an intersection of first approximate line L1 and second approximate line L2.

Similarly by employing the fatigue limit stress specification device described above, fitting is performed on the relation between the temperature amplitude of the fundamental frequency component and the temperature amplitude of the second harmonic component by using first approximate line L1 and second approximate line L2, first approximate line L1 including a quadratic curve, second approximate line L2 including a quadratic curve. Therefore, a fatigue limit stress can be precisely obtained.

Further, the present disclosure provides a fatigue limit stress specification method for measuring a fatigue limit stress of an object to be measured on the basis of a change in temperature of the object to be measured, the change in temperature being generated when the object to be measured (test piece 1) is vibrated while a load is increased stepwise. In this fatigue limit stress specification method, the load is repeatedly applied to the object to be measured at a predetermined frequency while the load is increased stepwise, and the change in temperature of the object to be measured that the load has been applied to is obtained. A relation between a temperature amplitude of a fundamental frequency component of vibration and a temperature amplitude of a second harmonic component is obtained, based on the change in temperature, and fitting is performed on the relation by using first approximate line L1 and second approximate line L2, first approximate line L1 including a quadratic curve, second approximate line L2 including a quadratic curve. The fatigue limit stress of the object to be measured is obtained on the basis of an intersection of first approximate line L1 and second approximate line L2.

Similarly by employing the fatigue limit stress specification method described above, fitting is performed on the relation between the temperature amplitude of the fundamental frequency component and the temperature amplitude of the second harmonic component by using first approximate line L1 and second approximate line L2, first approximate line L1 including a quadratic curve, second approximate line L2 including a quadratic curve. Therefore, a fatigue limit stress can be precisely obtained.

Other Exemplary Embodiments

As described above, the first exemplary embodiment has been described as an example of the technique disclosed in the present application. However, the technique of the present disclosure is not limited to the first exemplary embodiment, and is also applicable to other exemplary embodiments that undergo some modifications, replacements, additions, omissions, or the like, as appropriate. In addition, new embodiments can also be achieved by combining the respective components described in the first exemplary embodiment above.

As described above, the exemplary embodiments have been described as examples of the technique of the present disclosure. For this purpose, the accompanying drawings and the detailed description have been provided.

Accordingly, in order to exemplify the technique described above, the components described in the accompanying drawings and the detailed description may not only include components that are essential for solving the problems, but may also include components that are not essential for solving the problems. For this reason, it should not be immediately deemed that those components that are not essential are essential just because those components that are not essential are described in the accompanying drawings and the detailed description.

Moreover, since the exemplary embodiments described above have been provided to exemplify the technique of the present disclosure, various modifications, replacements, additions, omissions, or the like can be made within the scope of the claims or their equivalents.

In the exemplary embodiments described above, an infrared camera that is capable of obtaining a temperature distribution image has been used as a temperature sensor. A pixel that corresponds to a maximum stress concentration part has been selected from an image captured by the infrared camera, and a fatigue limit stress has been obtained on the basis of a change in temperature of the selected pixel. However, the temperature sensor according to the present disclosure is not limited to the infrared camera. For example, in a case where a maximum stress concentration part of an object to be measured has been specified in advance, a contact type or non-contact type temperature sensor may be used, and the fatigue limit stress may be obtained on the basis of a change in temperature at a specified point.

INDUSTRIAL APPLICABILITY

The present disclosure can be applied to a fatigue limit stress specification system that is capable of precisely measuring a fatigue limit stress of an object to be measured.

REFERENCE MARKS IN THE DRAWINGS

1 test piece (object to be measured)
10 vibration generator
30 infrared camera (temperature sensor)
50 information processing device (fatigue limit stress specification device)
51 controller (arithmetic unit)
58 device interface (obtaining unit)
60 monitor
100 fatigue limit stress specification system
L1 first approximate line
L2 second approximate line

The invention claimed is:

1. A fatigue limit stress specification system that measures a fatigue limit stress of an object to be measured based on a change in temperature of the object to be measured, the change in temperature being generated when the object to be measured is vibrated while a load is increased stepwise, the fatigue limit stress specification system comprising:
   a vibration generator that repeatedly applies each of the loads to the object to be measured at a predetermined frequency;
   a temperature sensor that obtains the change in temperature of the object to be measured that each of the loads has been applied to; and
   an information processing device that obtains the fatigue limit stress of the object to be measured based on the change in temperature that has been obtained from the temperature sensor,
   wherein the information processing device performs:
      obtaining a relation between a temperature amplitude of a fundamental frequency component of vibration for the object to be measured and a temperature amplitude of a second harmonic component of the vibration, based on the change in temperature that has been obtained by the temperature sensor;
      performing fitting on the relation by using a first approximate line and a second approximate line, the first approximate line including a quadratic curve, the second approximate line including a quadratic curve; and
      obtaining the fatigue limit stress of the object to be measured based on an intersection of the first approximate line and the second approximate line.

2. The fatigue limit stress specification system according to claim 1, wherein
   the first approximate line is used to perform fitting on data within a range having the temperature amplitude of the fundamental frequency component that is less than or equal to a predetermined value, and
   the second approximate line is used to perform fitting on data within a range having the temperature amplitude of the fundamental frequency component that is greater than or equal to the predetermined value.

3. The fatigue limit stress specification system according to claim 2, wherein
   the first approximate line is expressed as $y=ax^2+b$,
   the second approximate line is expressed as $y=ax^2+cx+d$, and
   x is the temperature amplitude of the fundamental frequency component, y is the temperature amplitude of the second harmonic component, and a, b, c, and d are coefficients.

4. The fatigue limit stress specification system according to claim 1, wherein the first approximate line and the second approximate line are obtained by using a data range in a case where a maximum degree-of-freedom adjusted determination coefficient is obtained from among degree-of-freedom adjusted determination coefficients for the first approximate line and the second approximate line in a plurality of data ranges.

5. A fatigue limit stress specification device that measures a fatigue limit stress of an object to be measured based on a change in temperature of the object to be measured, the change in temperature being generated when the object to be measured is vibrated while a load is increased stepwise, the fatigue limit stress specification device comprising:
   an obtaining unit that obtains the change in temperature of the object to be measured; and
   an arithmetic unit that analyzes the change in temperature and measures the fatigue limit stress of the object to be measured,
   wherein the arithmetic unit performs:
      obtaining a relation between a temperature amplitude of a fundamental frequency component of vibration for the object to be measured and a temperature amplitude of a second harmonic component of the vibration, based on the change in temperature;
      performing fitting on the relation by using a first approximate line and a second approximate line, the first approximate line including a quadratic curve, the second approximate line including a quadratic curve; and
      obtaining the fatigue limit stress of the object to be measured based on an intersection of the first approximate line and the second approximate line.

6. A fatigue limit stress specification method for measuring a fatigue limit stress of an object to be measured based on a change in temperature of the object to be measured, the change in temperature being generated when the object to be measured is vibrated while a load is increased stepwise, the fatigue limit stress specification method comprising:

repeatedly applying the load to the object to be measured at a predetermined frequency while the load is increased stepwise;

obtaining the change in temperature of the object to be measured that the load has been applied to;

obtaining a relation between a temperature amplitude of a fundamental frequency component of vibration for the object to be measured and a temperature amplitude of a second harmonic component of the vibration, based on the change in temperature;

performing fitting on the relation by using a first approximate line and a second approximate line, the first approximate line including a quadratic curve, the second approximate line including a quadratic curve; and obtaining the fatigue limit stress of the object to be measured based on an intersection of the first approximate line and the second approximate line.

\* \* \* \* \*